United States Patent [19]
Holleman et al.

[11] 3,865,692
[45] Feb. 11, 1975

[54] METHOD FOR MAKING HIGHLY POTENT PLASMINOGEN

[75] Inventors: William Homer Holleman, Libertyville; William Wolcott Andres, Lindenhurst, both of Ill.

[73] Assignee: Abbott Laboratories, North Chicago, Ill.

[22] Filed: Jan. 11, 1974

[21] Appl. No.: 432,789

[52] U.S. Cl.................. 195/66 B, 424/94, 424/101
[51] Int. Cl.......................... A61k 19/00, C07g 7/02
[58] Field of Search.................. 424/101; 195/66 B

[56] References Cited
OTHER PUBLICATIONS
Heimburger–Chem. Abst., Vol. 74 (1971) page 24993e.

*Primary Examiner*—Sam Rosen
*Attorney, Agent, or Firm*—Paul D. Burgauer; Robert L. Niblack

[57] ABSTRACT

The present invention is directed to a process for making pure human plasminogen suitable for the preparation of the plasminogen-streptokinase complex. The method of the present invention allows the removal of impurities from plasminogen prior to complexing the latter with streptokinase, resulting in a plasminogen-streptokinase complex with much higher plasminogen activating activity.

9 Claims, No Drawings

METHOD FOR MAKING HIGHLY POTENT PLASMINOGEN

DETAILED DESCRIPTION OF THE INVENTION

In a number of publications in recent years, it has been shown that the combination of plasminogen with streptokinase produces an agent possessing in vivo thrombolytic activities similar to streptokinase. More recently, it has been discovered that the two components combine to form a true (1:1 molar ratio) complex and even more recently, it was discovered that this complex between plasminogen and streptokinase does not react with antibodies produced against streptokinase.

The allergic reaction caused by streptokinase apparently is based on the fact that the human body produces long-lasting antibodies against streptokinase after a first administration of the latter or after a streptococcal infection. Upon subsequent treatment of the same patient with streptokinase, very serious allergic reactions occur. Upon administration of the plasminogen-streptokinase complex, such allergic reactions can be totally avoided so that currently, treatment with this complex is strongly preferred, particularly because it is not required to know whether the patient has a residue of antibodies against streptokinase. The plasminogen-streptokinase complex can be administered to animals that have previously been treated with streptokinase alone or animals that have previously been given the above complex.

Unfortunately, the methods shown in the prior art for producing the above complex are deficient in that they produce a material of rather weak titer. Some of the best methods of the prior art produce a complex that shows only 10 – 15,000 units/mg. of fibrinolytic activity, ordinarily referred to as CTA units (1 CTA unit is the standard unit of urokinase activity established by the Heart Institute Committee on Thrombolytic Agents; Fletscher, et al., J. Lab. Clin. Med., Vol. 65, pages 713 – 731 of May, 1965).

It has now been discovered that by properly treating the human plasminogen prior to complex formation with streptokinase, the fibrinolytic activity of the complex can be raised to a level heretofore unknown. The method of the present invention produces a plasminogen which, upon combining with an equimolar amount of streptokinase produces a complex of 45 – 55,000 CTA units/mg. of fibrinolytic activity.

The process of the current invention consists essentially in preparing a solution of 0.5 – 50 mg./ml. of plasminogen freed of hepatitis agent in water buffered to a pH of 5 – 10 and containing 0.01 – 2 molar concentration of a solubility enhancer, precipitating the impurities of said plasminogen by adding ammonium sulfate to this solution to a molar concentration of between 0.1 and $y$, removing the precipitate and precipitating the substantially pure human plasminogen by adjusting the molar concentration of the ammonium sulfate of the solution so obtained to a level of between $x$ and 4.0 wherein $x - y$ represents a molarity difference of at least 0.2 and $y$ is between 0.6 and 1.2. Combining the plasminogen purified in the above manner with an equimolar amount of streptokinase in known fashion, a much more potent plasminogen-streptokinase complex is obtained than known by the prior art.

In the preferred embodiment, the plasminogen is of human origin but the plasminogen of other mammals can be treated in the same manner for the purpose of obtaining a substantially pure blood component.

It is well known that plasminogen which has been heated to inactivate hepatitis virus does not dissolve readily in water alone; it dissolves much faster in water of a certain ionic strength. For this reason, it is often desirable to add an inorganic, water-soluble and preferably nontoxic salt to the plasminogen solution to be treated in the above manner. Thus, to facilitate the dissolution of plasminogen, water containing 5 – 20 mg./ml. of sodium chloride is often used but other salts such as potassium or ammonium chloride may also be used.

The above reference to a solubility enhancer ordinarily refers to amino acids. The preferred agents of that nature are lysine and $\epsilon$-aminocaproic acid.

In order to illustrate the process of the present invention, reference is made to the following example which, however, is not meant to limit the invention in any respect.

EXAMPLE

A 10 percent weight/volume suspension of Cohn's blood fraction $III_{2,3}$ was extracted overnight with 0.05 molar tris(hydroxymethyl)amino-methane (hereinafter referred to as TRIS), 0.02 molar lysine, 0.1 molar sodium chloride and 0.001 molar of ethylene diaminetetracetic acid (hereinafter referred to as EDTA). The solution was clarified by centrifugation and 10 liters of this suspension were applied to a 5 ×50cm column of lysineagarose prepared according to the method of Cuatrecasas (J. Biol. Chem., 245, 3059 of 1970), with the agarose containing about 7 micromoles of lysine per milliliter of agarose. The column was eluted at 4° C. with a 0.1 molar sodium phosphate solution adjusted to a pH of 7.4 until the absorbency is less than 0.1 at 280nm. The plasminogen was eluted from the column with a 0.2 molar $\epsilon$-aminocaproic acid, 0.1 molar sodium phosphate (pH 7.4) solution. The eluates containing active plasminogen were pooled, precipitated with 2 molar ammonium sulfate and redissolved in 0.05 molar TRIS, 0.02 lysine, 0.1 molar sodium chloride and 0.001 molar EDTA of pH 9.0 and stored frozen until used for inactivating any hepatitis virus. This is accomplished by diluting the plasminogen solution to a concentration of 0.6 mg./ml. with 0.15 molar glycine at pH 3.0 and heating the mixture to 60° C. for 10 hours as suggested by R. Murrey in N.Y. Academy of Med., 31, No. 5, Page 352 (1955). The plasminogen so treated was precipitated with 2.0 molar ammonium sulfate and dissolved in 0.05 molar TRIS, 0.02 molar lysine, 0.01 sodium chloride and 0.001 molar EDTA at pH 9.0. This plasminogen solution was cooled to 0° C. adjusted to a 0.6 molar concentration of ammonium sulfate and the precipitate was removed by centrifugation. Plasminogen remained in the supernatant; it was precipitated by adding ammonium sulfate thereto to produce a molar concentration of 2.0 of the latter and the precipitate was centrifuged and dissolved again in the above TRIS/lysine buffer resulting in a plasminogen solution of high purity suitable for pharmaceutical use and/or extended storage.

In order to make the above complex, this plasminogen solution was added at 0° C. to an equimolar amount of streptokinase dissolved in a sodium phosphate buffer of pH 7.4. After incubation at 25° C. for 10 minutes, the complex was precipitated by adding ammonium sulfate to a molar concentration of 0.6. The precipitate was centrifuged and any excess streptokinase removed by thoroughly washing the complex with an 0.6 molar ammonium sulfate solution buffered to a pH of 7.4 with 0.1 molar sodium phosphate. After centrifugation, the wash was discarded and the precipitate was dissolved in an 0.1 molar ε-aminocaproic acid solution containing 0.1 molar sodium chloride and buffered to 7.1 to give a final concentration of about 5 mg./ml. This material can be freeze-dried and lyophilyzed for indefinite storage. It has a thrombolytic activity of between 45 – 55,000 CTA units per mg.

A plasminogen-streptokinase complex of substantially identical thrombolytic activity is obtained by using a plasminogen that is purified by the above process with the difference that the molarity of ammonium sulfate for precipitating the impurities is 1.0 and the plasminogen itself is precipitated by adjusting the ammonium sulfate concentration to 1.6 molar. When the former value is increased to 1.2, highly pure plasminogen is obtained but the yield is slightly lower. Where the impurities are precipitated at molar concenntration 0.6 and the plasminogen is recovered at an ammonium sulfate concentration of 1.2, excellent purities and yields are observed. For practical purpose, best results are obtained where the concentration difference between the two precipitation steps is at least 0.6 molar, preferably 1.0, and where the impurities are removed at a molar ammonium sulfate concentration of about 0.6.

As shown above, the molar concentrations indicated in the examples can be vaired within a wide range and a variety of buffers and inorganic salts may be used in place of the ingredients listed above. However, it is important that the plasminogen is purified by the above precipitating fractionation which involves the removal of inactive components by the addition of a low molar concentration of ammonium sulfate. The components precipitating at a molar concentration of 0.1 – 1.2 molar ammonium sulfate can be removed by a variety of methods, preferably by centrifugation. The desired component is then precipitated by increasing the molar concentration of ammonium sulfate to the range of 0.6 to 4.0. If desired, the final precipitate can be treated repeatedly in this fashion and in some instances, it may be desirable to ascertain highest purity of the plasminogen again just prior to its use for producing the complex with streptokinase. In that instance, the plasminogen is purified as shown above and stored and, at the desired time for complex formation with streptokinase, the purified plasminogen is again placed in the above type of solution and impurities are removed by adding a low molar concentration of ammonium sulfate, centrifugation and precipitating the desired, pure plasminogen by increasing the ammonium sulfate concentration in the supernatant.

We claim:

1. The process of purifying plasminogen consisting essentially in preparing a solution of 0.5 – 50 mg./ml. of a plasminogen free of hepatitis agent in water buffered to a pH of 5 – 10 and containing 0.01 – 2 molar concentration of a solubility enhancer, precipitating the impurities associated with said plasminogen by adding to said solution ammonium sulfate to a molar concentration of between 0.1 and $y$ removing the formed precipitate, and precipitating the substantially pure plasminogen by adjusting the molar concentration of ammonium sulfate of the solution so obtained to a molar concentration of between $x$ and 4.0 wherein $x - y$ represents a molarity difference of at least 0.2 and $y$ is between 0.6 and 1.2.

2. The process of claim 1 wherein said plasminogen is human plasminogen.

3. The process of claim 1 wherein said precipitate of impurities is removed by centrifugation.

4. The process of claim 1 wherein said substantially pure plasminogen is collected by centrifugation.

5. The process of claim 1 wherein said solubility enhancer is lysine.

6. The process of claim 1 wherein said solution containing plasminogen which is to be purified also contains between 5 and 20 mg./ml. of an inorganic salt.

7. The process of claim 6 wherein said inorganic salt is sodium chloride.

8. The process of claim 1 wherein $x - y$ is 0.6.

9. The process of claim 8 wherein $y$ is 0.6 and $x$ is 1.2.

* * * * *